(12) United States Patent
Yano et al.

(10) Patent No.: US 11,094,944 B2
(45) Date of Patent: Aug. 17, 2021

(54) ELECTRICALLY CONDUCTIVE MATERIAL AND ELECTRODE MATERIAL

(71) Applicant: Sakai Chemical Industry Co., Ltd., Sakai (JP)

(72) Inventors: Seiichi Yano, Osaka (JP); Hiroshi Tsutsumi, Osaka (JP); Miho Kishi, Osaka (JP); Akihiro Uemura, Osaka (JP); Mayu Ota, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 100 days.

(21) Appl. No.: 16/476,502

(22) PCT Filed: Feb. 21, 2018

(86) PCT No.: PCT/JP2018/006292
§ 371 (c)(1),
(2) Date: Jul. 8, 2019

(87) PCT Pub. No.: WO2018/159420
PCT Pub. Date: Sep. 7, 2018

(65) Prior Publication Data
US 2020/0058945 A1  Feb. 20, 2020

(30) Foreign Application Priority Data
Mar. 1, 2017  (JP) .............................. JP2017-038277

(51) Int. Cl.
*H01M 4/00* (2006.01)
*H01M 4/92* (2006.01)
(Continued)

(52) U.S. Cl.
CPC ............ *H01M 4/925* (2013.01); *C01G 23/04* (2013.01); *H01B 1/08* (2013.01); *H01M 8/10* (2013.01); *H01M 2008/1095* (2013.01)

(58) Field of Classification Search
CPC ........... H01M 8/10; H01M 2008/1095; H01M 4/8673; H01M 4/9075; C01G 23/04; C01P 2006/625
See application file for complete search history.

(56) References Cited

U.S. PATENT DOCUMENTS

2016/0137846 A1  5/2016 Rueger
2017/0130055 A1*  5/2017 Isobe ...................... C08K 3/22

FOREIGN PATENT DOCUMENTS

CN  101278422  10/2008
CN  102812150  12/2012
(Continued)

OTHER PUBLICATIONS

Smith, et al., "Electrodes based on Magneli phase titanium oxides: the properties and application of Ebonex materials", Journal of Applied Electrochemistry 28 (1998) 1021-1033.

*Primary Examiner* — Cynthia H Kelly
*Assistant Examiner* — Monique M Wills
(74) *Attorney, Agent, or Firm* — Hamre, Schumann, Mueller & Larson, P.C.

(57) ABSTRACT

The present invention provides an electrically conductive material having excellent resistance to a high potential and strongly acidic environment and high electrical conductivity; and an electrode material and a fuel cell each including the same. The present invention also provides a method for simply and easily producing such an electrically conductive material. The present invention relates to an electrically conductive material including a titanium suboxide particulate powder, the titanium suboxide particulate powder including a rutile crystalline phase as a main phase, and having a composition of $TiO_n$ wherein n is 1.5 or more and 1.90 or less, and a brightness L* in the L*a*b* color system of 35 to 45.

6 Claims, 8 Drawing Sheets

(51) Int. Cl.
  *C01G 23/04*    (2006.01)
  *H01B 1/08*     (2006.01)
  *H01M 8/10*     (2016.01)
  *H01M 8/1018*   (2016.01)

(56) References Cited

FOREIGN PATENT DOCUMENTS

| | | |
|---|---|---|
| CN | 102820497 | 12/2012 |
| CN | 104517739 | 4/2015 |
| CN | 104658768 | 5/2015 |
| CN | 105308127 | 2/2016 |
| CN | 107278171 | 10/2017 |
| JP | 58-091037 | 5/1983 |
| JP | 61-106414 | 5/1986 |
| JP | 64-072922 | 3/1989 |
| JP | 11-292536 | 10/1999 |
| JP | 2005-089213 | 4/2005 |
| JP | 2006-210135 | 8/2006 |
| JP | 2008-150240 | 7/2008 |
| WO | 2006/124248 | 11/2006 |
| WO | 2013-141063 | 9/2013 |
| WO | 2016/005855 | 1/2016 |

\* cited by examiner

ELECTRICALLY CONDUCTIVE MATERIAL AND ELECTRODE MATERIAL

TECHNICAL FIELD

The present invention relates to electrically conductive materials and electrode materials. Specifically, the present invention relates to an electrically conductive material, an electrode material and a fuel cell each including the electrically conductive material, and a method for producing an electrically conductive material.

BACKGROUND ART

Fuel cells are devices that generate electric power by electrochemically reacting fuel such as hydrogen or alcohol with oxygen. They are classified into different types of cells such as polymer electrolyte fuel cells (PEFCs), phosphoric acid fuel cells (PAFCs), molten-carbonate fuel cells (MCFCs), and solid oxide fuel cells (SOFCs), according to factors such as electrolyte and operating temperature. Polymer electrolyte fuel cells, for example, are used as stationary power sources or for fuel cell vehicles, and are thus expected to maintain desired power generation performance for a long period of time.

Polymer electrolyte fuel cells use an ion conductive polymer membrane (ion exchange membrane) as an electrolyte. Such fuel cells commonly have a catalyst containing platinum (Pt) supported on an electrically conductive material such as carbon as an electrode. When such polymer electrolyte fuel cells are used in automotive applications, for example, large load fluctuations due to operations such as start and stop may promote oxidation reaction of carbon ($C+2H_2O \rightarrow CO_2+4H^++4e^-$) of a catalyst for electrodes. For example, when the potential of the cathode is not lower than 0.9 V, the oxidation reaction of carbon easily proceeds. In this case, aggregation or detachment of platinum from the carbon occurs, thus significantly reducing the fuel cell performance. For such problems, catalysts including titanium, for example, in place of carbon have been proposed in recent years (see, for example, Patent Literature 1). Furthermore, a technique of using single-crystal $Ti_4O_7$ has been proposed (see Non-Patent Literature 1).

CITATION LIST

Patent Literature

Patent Literature 1: WO 2013/141063

Non-Patent Literature

Non-Patent Literature 1: J. R. SMITH and two others, "Electrodes based on Magneli phase titanium oxides: the properties and applications of Ebonex® materials", J. APPL. ELECTROCHEM, October 1998, Vol. 28, Issue 10, pp. 1021-1033

SUMMARY OF INVENTION

Technical Problem

Carbon is usually used as an electrically conductive material for electrodes as described above. However, carbon has a problem of corrosion caused by oxidation reaction, for example, when it is used at high potential. Further, since electrodes are usually used in a strongly acidic environment with a pH of 1 or less, electrically conductive materials are required to have resistance to a strongly acidic environment. Unfortunately, electrically conductive materials alternative to carbon and resistant to a high potential and strongly acidic environment have not been found yet.

Possible alternatives to carbon are titanium oxides having high resistance to a high potential and strongly acidic environment, in particular, titanium suboxides, more in particular, $Ti_4O_7$ having high electrical conductivity (also referred to as electron conductivity). Certainly, single-crystal $Ti_4O_7$ has electrical conductivity comparable to that of carbon (see Non-Patent Literature 1). However, the inventors studied and found that $Ti_4O_7$ having a specific surface area of 10 m²/g or greater prepared to support a noble metal thereon has low electrical conductivity (see Comparative Example 5 described below).

Patent Literature 1 discloses a catalyst containing a metal supported on a low-valent titanium oxide that is represented by the compositional formula $TiO_x$ (where x satisfies $1.5 < x < 2$) and has a specific surface area of 50 m²/g or greater. This catalyst is in the form of black particles. However, even such a catalyst has insufficient electrical conductivity, and electrically conductive materials alternative to carbon have not been found yet.

In view of the current state, the present invention aims to provide an electrically conductive material having excellent resistance to a high potential and strongly acidic environment and having high electrical conductivity, and an electrode material and a fuel cell each including the same. The present invention also aims to provide a method for simply and easily producing such an electrically conductive material.

Solution to Problem

The present inventors have made intensive studies on electrically conductive materials alternative to carbon, and have found that the oxygen vacancies in titanium suboxide particulate powders are not always uniformly present throughout the particulate powders. Specifically, even if the average oxygen vacancy is sufficient throughout the entire titanium suboxide powder, the very limited surface of the particles may have insufficient oxygen vacancies. This is presumably because the outermost surface of the particles exposed to air or moisture is re-oxidized to result in the absence of oxygen vacancies. The present inventors have made intensive studies based on the assumption that particulate powders prepared by known methods have insufficient oxygen vacancies on the very limited surface and low electrical conductivity, and found that particulate powders having certain oxygen vacancies both therein and on the surface thereof have a specific color tone and high electrical conductivity. They also found that low-valent titanium oxides cannot maintain the crystal structure under severe use conditions depending on the crystalline phases, leading to a decrease in electrical conductivity. Thus, they found that an electrically conductive material including a titanium suboxide particulate powder that is represented by a certain compositional formula, includes a rutile crystalline phase as a main phase, and has a brightness L* in the L*a*b*color system within a certain range has high electrical conductivity even under severe use conditions such as a high potential and strongly acidic environment. Such an electrically conductive material is useful as an alternative to carbon. The present inventors also found that such an electrically conductive material can be simply and easily produced by a production method including firing a raw material containing a titanium oxide having a specific surface area of 20 m²/g or greater in a reducing atmosphere, followed by firing in an ammonia atmosphere at 500° C. or higher, or firing the raw material in a reducing atmosphere in the presence of ammonia. Thus, the present inventors arrived at solutions to the above problems, and have thus completed the present invention.

That is, the present invention relates to an electrically conductive material including a titanium suboxide particulate powder,
the titanium suboxide particulate powder including
a rutile crystalline phase as a main phase, and having
a composition of $TiO_n$
wherein n is 1.5 or more and 1.90 or less, and
a brightness L* in the L*a*b*color system of 35 to 45.

The present invention also relates to a method for producing the electrically conductive material, the method including
firing a raw material containing a titanium oxide having a specific surface area of 20 m2/g or greater in a reducing atmosphere, followed by firing in an ammonia atmosphere at 500° C. or higher, or
firing the raw material in a reducing atmosphere in the presence of ammonia.

The present invention also relates to an electrode material including a structure containing a noble metal and/or an oxide thereof supported on the electrically conductive material.

The electrode material is preferably an electrode material for a polymer electrolyte fuel cell.

The present invention also relates to a fuel cell including an electrode that includes the electrode material.

Advantageous Effects of Invention

The electrically conductive material of the present invention has sufficient resistance to a high potential and strongly acidic environment and has high electrical conductivity. Such an electrically conductive material is very useful as an electrically conductive material for electrodes for fuel cells such as polymer electrolyte fuel cells, solar cells, transistors, and display devices such as liquid crystal display panels; for antistatic agents, or for heat-ray shielding materials. The electrode material including this electrically conductive material is also useful for a variety of applications, in particular, for polymer electrolyte fuel cells. The method for producing an electrically conductive material of the present invention can easily and simply provide such an electrically conductive material, and is thus considered to be an industrially very advantageous technique.

BRIEF DESCRIPTION OF DRAWINGS

FIG. 3-1 is an X-ray powder diffraction pattern of a powder 1 obtained in Example 1.

FIG. 3-2 is an X-ray powder diffraction pattern of a powder 2 obtained in Example 2.

FIG. 3-3 is an X-ray powder diffraction pattern of a powder 3 obtained in Example 3.

FIG. 3-4 is an X-ray powder diffraction pattern of a powder 4 obtained in Example 4.

FIG. 3-5 is an X-ray powder diffraction pattern of a powder 5 obtained in Example 5.

FIG. 4-1 is an X-ray powder diffraction pattern of a powder c1 obtained in Comparative Example 1.

FIG. 4-2 is an X-ray powder diffraction pattern of a powder c2 obtained in Comparative Example 2.

FIG. 4-3 is an X-ray powder diffraction pattern of a powder c3 obtained in Comparative Example 3.

FIG. 4-4 is an X-ray powder diffraction pattern of a powder c4 obtained in Comparative Example 4.

FIG. 4-5 is an X-ray powder diffraction pattern of a powder c5 obtained in Comparative Example 5.

FIG. 4-6 is an X-ray powder diffraction pattern of a powder c6 obtained in Comparative Example 6.

DESCRIPTION OF EMBODIMENTS

Figure 1:
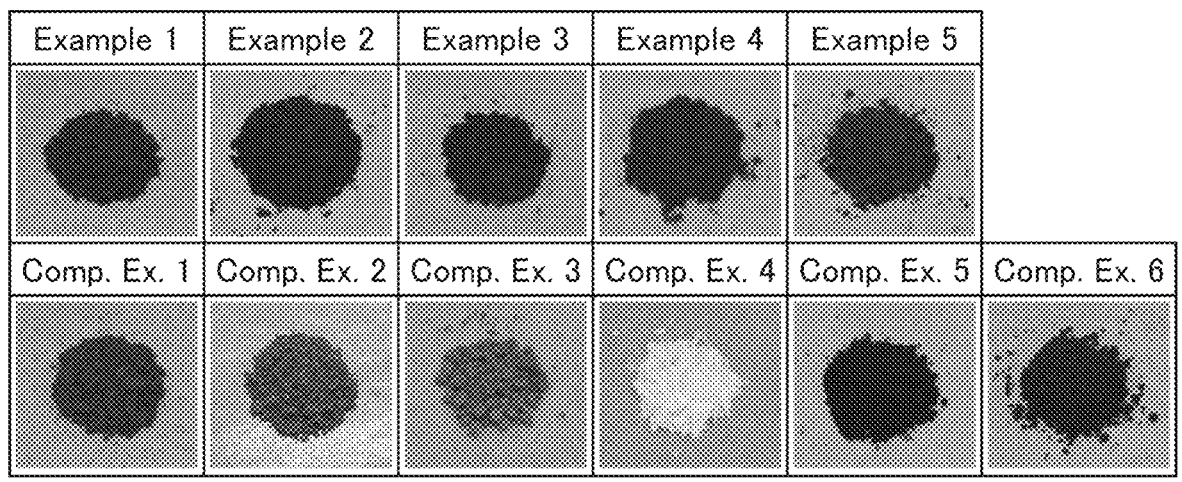
FIG. 1 shows photographs of the appearances of the particulate powders (powders) obtained in the examples and the comparative examples.

Preferred embodiments of the present invention are specifically described below, but the present invention is not limited to the following description, and modification may be suitably made without departing from the gist of the present invention.

1. Electrically Conductive Material

The electrically conductive material of the present invention includes a titanium suboxide particulate powder. That is, the electrically conductive material includes powdery and/or granular (particulate) titanium suboxide(s).

The titanium suboxide particulate powder has a composition of $TiO_n$ (where n is 1.5 or more and 1.90 or less). The titanium suboxide particulate powder may be a mixture of two or more titanium suboxide particulate powders each satisfying the composition. Only when such a composition and the below-described crystal structure and brightness L* value are satisfied can the titanium suboxide particulate powder have as a synergistic effect significantly improved electrical conductivity and excellent resistance to a high potential and strongly acidic environment.

The value n satisfies $1.5 \leq n \leq 1.90$. If n is more than 1.90 or less than 1.5, the titanium suboxide particulate powder may have significantly low electrical conductivity or may not have sufficient resistance to a high potential and strongly acidic environment. In terms of further enhancement of the electrical conductivity, n preferably satisfies $1.60 \leq n \leq 1.90$, more preferably $1.70 \leq n \leq 1.85$, still more preferably $1.70 \leq n \leq 1.80$.

The value n in the composition $TiO_n$ of the titanium suboxide particulate powder can be determined by measuring the weight difference between the particulate powders before and after heat treatment by the following procedure.

Specifically, a given amount of the titanium suboxide particulate powder is preliminarily dried at 100° C. for one hour using a dryer (e.g., air convection constant temperature oven DKM600 available from Yamato Scientific Co., Ltd.) so that the moisture adsorbed thereto is removed; about 1 g of the titanium suboxide particulate powder is weighed to the nearest 0.1 mg in a magnetic crucible using an electron balance (e.g., an analysis balance ATX224 available from Shimadzu Corporation); and it is heated at 900° C. for one hour under atmospheric conditions using an electric furnace (e.g., a desktop electric furnace NHK-120H-II available from Nitto Kagaku Co., Ltd.). Thus, the titanium suboxide is converted to completely oxidized $TiO_2$ (n=2.00). After the heat treatment, the crucible is placed in a glass desiccator and cooled to room temperature, and the powder is weighed to the nearest 0.1 mg again. The weight increment during heat treatment corresponds to the amount of oxygen vacancies in $TiO_n$ relative to $TiO_2$.

When the weight of the titanium suboxide particulate powder before heat treatment is $W_1$ (g), the weight of powder after heat treatment is $W_2$ (g), the atomic weight of Ti is $M_T$, and the atomic weight of O is $M_O$, the following equalities hold.

Number of moles of TiO$_n$ before heat treatment=$W_1/(M_T+nM_O)$

Number of moles of TiO$_2$ after heat treatment=$W_2/(M_T+2M_O)$

Since there is no difference in the number of moles between TiO$_n$ before heat treatment and TiO$_2$ after heat treatment, the following equality holds.

$W_1/(M_T+nM_O)=W_2/(M_T+2M_O)$

Thus, n is calculated by $n=(W_1(M_T+2M_O)-W_2M_T)/W_2M_O$.

The titanium suboxide particulate powder contains a rutile crystalline phase as a main phase.

If an anatase or brookite crystalline phase is present as a main phase instead of a rutile crystalline phase, phase transition may be caused in a high potential and strongly acidic environment, which may change the physical properties of the powder. In contrast, a rutile crystalline phase containing a certain amount of oxygen vacancies has a stable crystal structure. Thus, the titanium suboxide particulate powder contains oxygen vacancies within an optimal range both throughout the particulate powder and on the surface thereof, and thus has high electrical conductivity even when it has a relatively high specific surface area, and excellent durability to a high potential and strongly acidic environment. Such a titanium suboxide particulate powder is suitable for the below-described electrode material or polymer electrolyte fuel cell applications.

The phrase "contains a rutile crystalline phase as a main phase" used herein means that the X-ray powder diffraction pattern of the titanium suboxide particulate powder (Cu Kα, angle range in measurement: 2θ=10° to 60°) contains diffraction peaks in the diffraction angle ranges of 2θ=27.4°±2°, 36.1°±2°, and 54.3°±2°; and contains no diffraction peak having an intensity exceeding 50%, preferably 30%, more preferably 25% of the intensity of the maximum peak appearing within the angle range in the measurement, outside the ranges of 2θ=27.4°±2°, 36.1°±2°, 39.2°±2°, 41.2°±2°, 44.1°±2°, 54.3°±2°, and 56.6°±2°. Specific measurement conditions of the X-ray powder diffraction pattern are described in the examples below.

When the XRD measurement data contains a large amount of noise as a whole, smoothing or background removal may be conducted using analysis software attached to the XRD system (e.g., X-ray powder diffraction pattern comprehensive analysis software "JADE7J" attached to an X-ray diffractometer (RINT-TTR3) available from Rigaku Corporation) before determination.

The titanium suboxide particulate powder has a brightness L* in the L*a*b* color system of 35 to 45.

L* is an index of the amount of oxygen vacancies on the surface of the particulate powder. If L* is greater than 45, the particulate powder contains an insufficient amount of oxygen vacancies on its surface, which may lead to a significant decrease in electrical conductivity. If L* is smaller than 35, the particulate powder cannot maintain the rutile crystalline phase, which may lead to a decrease in electrical conductivity. In addition, such a particulate powder may have insufficient resistance to a high potential and strongly acidic environment. In terms of further enhancement of the electrical conductivity, L* is preferably 35.0 or higher and 43.0 or less, more preferably 35.0 or higher and 41.0 or less.

The titanium suboxide particulate powder preferably contains less than 0.2 mass % of metal elements other than Ti. In this case, the possibility that the metal elements other than Ti leach out of the electrically conductive material during its use can be sufficiently eliminated. Thus, the performance of the electrically conductive material of the present invention is more exhibited.

Herein, the amount of the metal elements other than Ti can be determined by X-ray fluorescence (XRF) analysis or inductive coupling plasma (ICP) analysis.

The term "metal elements" encompass metalloid atoms such as silicon.

The titanium suboxide particulate powder preferably has a volume resistance (also referred to as volume specific resistance) of 10.0 Ω·cm or less. A lower volume resistance means better electrical conductivity. The volume resistance is more preferably 1.0 Ω·cm or less, still more preferably 0.1 Ω·cm or less.

Herein, the volume resistance can be determined by the method disclosed in the examples described later.

The titanium suboxide particulate powder may be doped with nitrogen with firing in an ammonia atmosphere as long as the crystal structure does not change. Specifically, the amount of doped nitrogen is preferably 10 mass % or less, more preferably 5 mass % or less.

2. Method for Producing Electrically Conductive Material

The electrically conductive material of the present invention can be simply and easily produced by a production method including firing a raw material containing a titanium oxide having a specific surface area of 20 m2/g or greater in a reducing atmosphere, followed by firing in an ammonia atmosphere at 500° C. or higher (also referred to as step (1-1)), or firing the raw material in a reducing atmosphere in the presence of ammonia (also referred to as step (1-2)). This production method may optionally further include, as needed, one or more other steps for usual production of powders.

The steps (1-1) and (1-2) use a raw material containing a titanium oxide having a specific surface area of 20 m$^2$/g or greater.

The term "titanium oxide" used herein refers to a titanium oxide (also referred to as "titanium dioxide") available on regular market, and specifically refers to what is called a "titanium oxide" in qualitative tests such as X-ray diffraction measurement.

The raw material has only to contain the titanium oxide. Use of the titanium oxide results in fewer impurities that may be present during the production of the electrode material. In addition, the titanium oxide is easily available, so that it is excellent in terms of stable supply. The titanium oxide may have any crystal structure, and may be a rutile titanium oxide or an anatase titanium oxide, for example.

The raw material may also contain a reduction aid.

Examples of the reduction aid include titanium metal, titanium hydride, and sodium borohydride. In particular, titanium metal or titanium hydride is preferred. The titanium suboxide particulate powder can be more efficiently obtained by firing the raw material containing titanium metal and/or titanium hydride. The proportion of the titanium metal and/or titanium hydride (when two or more thereof are present, the total amount thereof) is preferably 5 to 50 parts by weight, more preferably 8 to 40 parts by weight in terms of titanium metal based on 100 parts by weight of the total amount of the titanium oxide.

When the raw material is a mixture (material mixture) of two or more components, the mixture can be obtained by mixing the components by a usual mixing method, preferably by a dry method. In other words, the raw material mixture is preferably a dry mixture. A wet process may be dangerous because it may cause generation of hydrogen gas, for example.

Each raw material component may be of one kind or two or more kinds.

The step (1-1) includes firing a raw material in a reducing atmosphere (also referred to as reduction firing). The raw material may be fired directly. When the raw material contains a solvent, the solvent may be removed before firing.

The reducing atmosphere is not limited. Examples thereof include a hydrogen ($H_2$) atmosphere, a carbon monoxide (CO) atmosphere, and a mixed gas atmosphere of hydrogen and inert gas. In particular, a hydrogen atmosphere is preferred because the titanium suboxide particulate powder can be efficiently produced. The concentration of the hydrogen is preferably within the range of 5 to 100 vol %, more preferably 50 vol % or higher, still more preferably 75 vol % or higher, particularly preferably 100 vol %. In the reducing atmosphere, reducing gas is desirably continuously introduced into the reaction site (also referred to as reaction system) at which reduction occurs.

The firing temperature depends on conditions of a reducing atmosphere such as a hydrogen concentration, and is preferably 500° C. to 1100° C., for example. This allows the resulting electrically conductive material to have both high specific surface area and high electrical conductivity in a balanced manner. The firing temperature is more preferably 600° C. to 1050° C., still more preferably 650° C. to 900° C., particularly preferably 650° C. to 850° C.

The firing temperature herein means the highest temperature reached in the firing step.

The firing time, that is, the retention time at the firing temperature, also depends on conditions of a reducing atmosphere such as hydrogen concentration, and is preferably 5 minutes to 100 hours, for example. When the firing time is in the above range, the reaction proceeds more sufficiently, resulting in excellent productivity. The firing time is more preferably 30 minutes to 24 hours, still more preferably 60 minutes to 10 hours, particularly preferably 2 to 10 hours.

When the atmosphere is cooled after the completion of firing, the atmosphere may be mixed or replaced with a gas other than hydrogen (e.g., nitrogen gas).

The step (1-1) also includes, after firing the raw material in a reducing atmosphere, firing in an ammonia atmosphere (also referred to as ammonia firing). If ammonia firing is performed before reduction firing, the titanium suboxide particulate powder containing a rutile crystalline phase as a main phase cannot be obtained. The concentration of the ammonia is preferably within the range of 5 to 100 vol %, more preferably 50 vol % or higher, still more preferably 75 vol % or higher, particularly preferably 100 vol %.

After reduction firing in the step (1-1) (in the case where ammonia firing is performed after reduction firing), ammonia may be introduced into the system while the reduction temperature is maintained, or ammonia may be introduced into the system after the reduction temperature is lowered to the below-described firing temperature, for example, and then ammonia firing is conducted. Alternatively, the ammonia firing may be conducted after the reduction temperature is lowered to room temperature.

The firing temperature of the ammonia firing may be 500° C. or higher, preferably 500° C. to 1100° C., more preferably 500° C. to 900° C., still more preferably 500° C. to 700° C. The firing time, that is, the retention time at the firing temperature, is the same as the above-described firing time of the reduction firing (preferably firing in a hydrogen atmosphere). The firing temperature does not have to be constant over the retention time. For example, ammonia may be introduced into the system after the reduction firing (preferably firing in a hydrogen atmosphere) and until the firing temperature is lowered to 500° C.

The step (1-2) includes firing a raw material in a reducing atmosphere in the presence of ammonia. In this case, the raw material may be directly fired. When the raw material contains a solvent, the solvent may be removed before firing. The reducing atmosphere is as described above. In the step (1-2), ammonia and reducing gas such as hydrogen may be simultaneously introduced into the system for firing, or a gas mixture of ammonia and reducing gas such as hydrogen may be introduced for firing.

The firing temperature and firing time in the step (1-2) are the same as those for the above-described ammonia firing.

3. Electrode Material

The electrode material of the present invention has a structure containing a noble metal and/or its oxide supported on the electrically conductive material of the present invention.

One or more noble metals and/or their oxides may be supported on the electrically conductive material. Any noble metal may be used. The noble metal is preferably at least one metal selected from the group consisting of platinum, ruthenium, iridium, rhodium, and palladium because such noble metal enables an easy and stable catalytic reaction of the resulting electrode. In particular, platinum is more preferred. The noble metal forms an alloy depending on production conditions. The noble metal may partially or entirely form an alloy with titanium for possible further improvement in conductivity and electrochemical properties.

The supported amount of the noble metal and/or its oxide is preferably 0.01 to 50 parts by weight relative to 100 parts by weight of the electrically conductive material (titanium suboxide particulate powder) in terms of the noble metal element (when two or more of the noble metal and/or its oxide are used, the total supported amount preferably falls within the above range). The noble metal and/or its oxide in such an amount is more finely dispersed, thus further improving the performance of the electrode material. The supported amount is more preferably 0.1 to 30 parts by weight, still more preferably 1 to 15 parts by weight.

The supported amount of the noble metal and/or its oxide may be determined using X-ray fluorescence (XRF) analysis or inductive coupling plasma (ICP) analysis, for example.

In addition to the noble metal and/or its oxide, the electrode material may further contain at least one metal selected from the group consisting of nickel, cobalt, iron, copper, and manganese.

The electrode material of the present invention has excellent resistance to a high potential and strongly acidic environment and has high electrical conductivity comparable to or higher than that of a material containing platinum supported on a conventional carbon carrier. Such electrode material can be suitable as an electrode material for fuel cells, solar cells, transistors, and display devices such as liquid crystal display panels. In particular, the electrode material is suitable as an electrode material for polymer electrolyte fuel cells (PEFCs). The embodiment in which the electrode material is an electrode material for polymer electrolyte fuel cells as described above is one preferred embodiment of the present invention. The present invention encompasses a fuel cell including an electrode including the electrode material.

4. Method for Producing Electrode Material

The electrode material of the present invention can be easily and simply produced, for example, by a production method including a step (1) of firing a raw material containing titanium oxide having a specific surface area of 20 $m^2/g$ or greater in a reducing atmosphere, followed by firing in an ammonia atmosphere at 500° C. or higher (step (1-1)), or of firing the raw material in a reducing atmosphere in the presence of ammonia (step (1-2)); and a step (2) of allowing a noble metal and/or its oxide to be supported on the electrically conductive material obtained in the step (1) using a mixture containing the electrically conductive material and the noble metal and/or its water-soluble compound. This production method may optionally further include, as needed, one or more other steps for usual powder production.

The step (1) (i.e., the step (1-1) or (1-2)) is as described above.

The step (2) is a step of allowing a noble metal and/or its oxide to be supported on the electrically conductive material obtained in the step (1) (titanium suboxide particulate powder) using a mixture containing the electrically conductive material and the noble metal and/or its water-soluble compound (hereinafter, also collectively referred to as a "noble metal compound").

The method may include one or more other steps such as crushing, washing with water, and classification, as needed, between the steps (1) and (2). Other steps are not limited.

The mixture preferably further contains a solvent.

The solvent may be of any type such as water, an acidic solvent, an organic solvent, or a mixture thereof. The solvent is preferably water, with ion-exchanged water being more preferred.

The solution of the noble metal compound may be any solution that contains a noble metal compound (i.e., a noble metal and/or its water-soluble compound). It is preferably a solution such as a chloride solution, a nitrate solution, a dinitrodiammine nitric acid solution, or a bis(acetylacetonato) platinum (II) solution. The noble metal is as described above, and platinum is particularly preferred. Thus, the solution of a noble metal is particularly preferably an aqueous chloroplatinic acid solution or an aqueous dinitrodiammine platinum nitric acid solution. In terms of reactivity, an aqueous chloroplatinic acid solution is most preferred.

The step (2) may include reduction, surface treatment, and/or neutralization of the mixture, as needed. For example, for reduction, the mixture is preferably mixed with a reducing agent to adequately reduce the noble metal compound. For surface treatment, the mixture is preferably mixed with a surfactant to optimize the surfaces of the titanium suboxide particulate powder and the noble metal compound. For neutralization, the mixture is preferably mixed with a basic solution. When two or more of reduction, surface treatment, and neutralization are performed, the reducing agent, the surfactant, and the basic solution may be added separately in any order or may be added together.

Non-limiting examples of the reducing agent include hydrazine chloride, hydrazine, and sodium borohydride. Preferred is hydrazine chloride. The amount of the reducing agent added is not limited, and it is preferably 0.1 to 1 times the molar equivalent of the noble metal contained in the mixture.

Non-limiting examples of the surfactant include polydimethyl diallyl ammonium chloride, polyvinyl alcohol, and polyvinylpyrrolidone. The amount of the surfactant added is not limited, and it is preferably 0.01 to 10 parts by weight, more preferably 0.1 to 5.0 parts by weight, relative to the total 100 parts by weight of the titanium suboxide particulate powder.

Non-limiting examples of the basic solution include an aqueous NaOH solution, an aqueous $NH_3$ solution, and an aqueous sodium carbonate solution. Preferred is an aqueous NaOH solution. The neutralization temperature during neutralization is preferably 60° C. to 100° C., more preferably 70° C. to 100° C.

In the step (2), moisture and by-products are preferably removed from the mixture (which may be one reduced, surface-treated, and/or neutralized, as needed, as described above). The moisture and by-products may be removed by any method, and are preferably removed by filtration, washing with water, drying, or evaporation under heating, for example.

The step (2) particularly preferably includes reducing a mixture containing the titanium suboxide particulate powder obtained in the step (1) and a noble metal compound, filtering and drying the reduced mixture to obtain a powder, and firing the powder.

5. Fuel Cell

The electrode material of the present invention is suitable for fuel cell electrode material applications. In particular, the electrode material is suitable as an electrode material for polymer electrolyte fuel cells (PEFCs), and is particularly useful as an alternative to a material containing platinum supported on a conventional carbon carrier. Such an electrode material is suitable for both a positive electrode (also referred to as "air electrode") and a negative electrode (also referred to as "fuel electrode"), and is also suitable for both a cathode (positive electrode) and an anode (negative electrode). A polymer electrolyte fuel cell including the electrode material of the present invention is one preferred embodiment of the present invention.

EXAMPLES

Specific examples are provided below to describe the present invention in detail. The present invention is not limited to these examples. The "%" means "% by weight (% by mass)" unless otherwise specified.

The following describes the measurement methods of the physical properties.

1. X-Ray Diffraction Pattern

An X-ray powder diffraction pattern was measured using an X-ray diffractometer (trade name "RINT-TTR3" available from Rigaku Corporation) under the following conditions.

X-ray source: Cu-Kα ray
Measurement range: 2θ=10° to 60°
Scanning speed: 5°/min
Voltage: 50 kV
Current: 300 mA 2. Brightness L* in the L*a*b* Color System The brightness L* in the L*a*b* color system was determined using a colorimeter (trade name "SE2000" available from Nippon Denshoku Industries Co., Ltd.).

3. Volume Resistance (Also Referred to as Volume Specific Resistance)

The volume resistance was determined using a powder resistivity measurement system MCP-PD51 available from Mitsubishi Chemical Analytech Co., Ltd. The powder resistivity measurement system includes a powder pressing part using hydraulic pressure, a four-terminal probe, and a high resistivity meter (Loresta-GX MCP-T700 available from the same company).

The value of the volume resistance (Q cm) was determined by the following procedure.

1) A powder sample was put in a press member (diameter: 20 mm) equipped with a four-terminal probe at the bottom surface, and the press member was set in a pressing part of the powder resistivity measurement system. The probe was connected to the high resistivity meter by a cable.

2) A pressure was applied up to 20 kN using a hand press. The thickness of the powder was determined using a digital caliper, and the resistance value was determined using the high resistivity meter.

3) The volume specific resistance ($\Omega \cdot cm$) was determined from the base area, thickness, and resistance value of the powder using the following mathematical formula 1.

$$\text{Volume specific resistance } (\Omega \cdot cm) = \frac{\text{Resistance value } (\Omega) \text{ measured} \times \text{Base area of powder } (cm^2)}{\text{Thickness of powder } (cm)}$$

(Mathematical formula 1)

4. High Potential Durability (1) Production of Working Electrode

Each sample to be measured was mixed with a 5% by weight perfluorosulfonic acid resin solution (Sigma-Aldrich Japan), isopropyl alcohol (Wako Pure Chemical Industries, Ltd.), and super pure water, followed by ultrasonic dispersion. Thus, a paste was prepared. The paste was applied to an electrode and sufficiently dried. The dried electrode was obtained as a working electrode.

(2) Measurement of Cyclic Voltammogram

A working electrode, a counter electrode, and a reference electrode were connected to an automatic polarization system (trade name "HZ-7000" available from Hokuto Denko Corporation). The working electrode was the electrode with the sample to be measured obtained as described above, and the counter electrode and the reference electrode were respectively a platinum electrode and a reversible hydrogen electrode (RHE).

Argon gas was bubbled through an electrolyte solution (0.1 mol/l aqueous perchloric acid solution) at 25° C. for 30 minutes so that an electrolytic cell was sufficiently saturated with argon gas. Then, cyclic voltammetry was performed from 0.05 V to 1.2 V at a sweep rate of 50 mV/sec and at 25° C. using the electrolyte solution (0.1 mol/l aqueous perchloric acid solution) saturated with argon gas.

Thereafter, cyclic voltammetry was performed with the upper limits of the potential sweep of 1.4 V, 1.6 V and 1.8 V.

The waveforms obtained by sweeping were plotted to overlap with each other. The changes in the waveforms in the high potential sweeping were visually observed. The high potential durability was determined based on the result.

5. Electrochemical Surface Area (ECSA)

(1) Production of Working Electrode

The working electrode was produced by the same method as in (1) in "4. High potential durability."

(2) Cyclic Voltammetry Measurement

Cyclic voltammetry was performed by the same method as in (2) in "4. High potential durability."

Then, the electrochemical surface area was calculated from the area of a hydrogen adsorption waveform obtained by sweeping (charge of hydrogen adsorption: QH ($\mu$C)) using the following mathematical formula 2. The result was used as an indicator of electrochemical properties. In the mathematical formula 2, "210 ($\mu Ccm^2$)" is the adsorbed charge per unit active area of platinum (Pt).

Active area of Pt catalyst per gram of Pt=$\{-QH$ ($\mu$C)/210($\mu Ccm^2$)$\times 10^4\} \times \{1$/weight (g) of Pt$\}$ (Mathematical formula 2)

6. Supported Amount of Platinum

The amount of platinum in each sample was measured using a scanning X-ray fluorescence spectrometer ZSX Primus II (Rigaku Corporation), and the supported amount of platinum was calculated.

7. Method for Measuring Metal Elements Other than Titanium

The amount of metal was determined using a scanning X-ray fluorescence spectrometer ZSX Primus II (Rigaku Corporation).

Example 1

After dry mixing 3.5 g of rutile titanium oxide (trade name: "STR-100N" available from Sakai Chemical Industry Co., Ltd., specific surface area: 100 $m^2$/g) and 0.525 g of titanium metal (trade name: "Titanium, Powder" available from Wako Pure Chemical Industries), the mixture was put in an alumina boat. The workpiece was put in an atmospheric furnace, and the temperature thereof was increased to 730° C. at a temperature increase rate of 300° C./hr under a hydrogen gas (Iwatani Corporation, the same applies hereinafter) flow of 400 ml/min. The temperature was kept at 730° C. for six hours. Thereafter, the supply of hydrogen gas was stopped. The temperature was lowered to 500° C. at a temperature decrease rate of 200° C./hr under an ammonia gas (Toyoko Kagaku Co., Ltd., the same applies hereinafter) flow of 400 ml/min. Then, the supply of ammonia gas was stopped. The temperature was lowered from 500° C. to room temperature by natural cooling under a nitrogen gas (Air Water Inc., the same applies hereinafter) flow of 400 ml/min. Thus, a powder 1 was obtained.

Example 2

A powder 2 was obtained as in Example 1, except that 13.1 g of rutile titanium oxide (trade name: "STR-100N" available from Sakai Chemical Industry Co., Ltd., specific surface area: 100 $m^2$/g) and 1.965 g of titanium metal (trade name: "Titanium, Powder" available from Wako Pure Chemical Industries) were dry mixed.

Example 3

First, 3.5 g of rutile titanium oxide (trade name: "STR-100N" available from Sakai Chemical Industry Co., Ltd., specific surface area: 100 $m^2$/g) and 0.525 g of titanium metal (trade name: "Titanium, Powder" available from Wako Pure Chemical Industries) were dry mixed. Then, the mixture was put in an alumina boat. The workpiece was put in an atmospheric furnace, and the temperature thereof was increased to 760° C. at a temperature increase rate of 300° C./hr under a hydrogen gas flow of 400 ml/min. The temperature was kept at 760° C. for two hours. Thereafter, the supply of hydrogen gas was stopped. The temperature was lowered to 500° C. at a temperature decrease rate of 200° C./hr under an ammonia gas flow of 400 ml/min. Then, the supply of ammonia gas was stopped. The temperature was lowered from 500° C. to room temperature by natural cooling under a nitrogen gas flow of 400 ml/min. Thus, a powder 3 was obtained.

Example 4

First, 13.1 g of rutile titanium oxide (trade name: "STR-100N" available from Sakai Chemical Industry Co., Ltd., specific surface area: 100 m$^2$/g) and 1.965 g of titanium metal (trade name: "Titanium, Powder" available from Wako Pure Chemical Industries) were dry mixed. Then, the mixture was put in an alumina boat. The workpiece was put in an atmospheric furnace, and the temperature thereof was increased to 750° C. at a temperature increase rate of 300° C./hr under a hydrogen gas flow of 400 ml/min. The temperature was kept at 750° C. for six hours. Thereafter, the supply of hydrogen gas was stopped. The temperature was lowered to 500° C. at a temperature decrease rate of 200° C./hr under an ammonia gas flow of 400 ml/min. Then, the supply of ammonia gas was stopped. The temperature was lowered from 500° C. to room temperature by natural cooling under a nitrogen gas flow of 400 ml/min. Thus, a powder 4 was obtained.

Example 5

First, 2.0 g of anatase titanium oxide (trade name: "SSP-25" available from Sakai Chemical Industry Co., Ltd., specific surface area: 270 m$^2$/g) and 0.3 g of titanium metal (trade name: "Titanium, Powder" available from Wako Pure Chemical Industries) were dry mixed. Then, the mixture was put in an alumina boat. The workpiece was put in an atmospheric furnace, and the temperature thereof was increased to 750° C. at a temperature increase rate of 300° C./hr under a hydrogen gas flow of 400 ml/min. The temperature was kept at 750° C. for one hour, and then lowered to 550° C. at a temperature decrease rate of 200° C./hr. Thereafter, the supply of hydrogen was stopped. The temperature was kept at 550° C. for one hour under a nitrogen gas flow of 400 ml/min. Then, the supply of ammonia gas was stopped. The temperature was lowered from 550° C. to room temperature by natural cooling under a nitrogen gas flow of 400 ml/min. Thus, a powder 5 was obtained.

Comparative Example 1

First, 20.0 g of rutile titanium oxide (trade name: "STR-100N" available from Sakai Chemical Industry Co., Ltd., specific surface area: 100 m$^2$/g) was put in an alumina boat. The workpiece was put in a furnace, and the temperature thereof was increased to 920° C. at a temperature increase rate of 300° C./hr under atmospheric conditions. The temperature was kept at 920° C. for one hour, and then lowered to room temperature by natural cooling. Thereafter, a 3.5-g portion of the resulting powder was put in an alumina boat. The workpiece was put in an atmospheric furnace, and the temperature was increased to 600° C. at a temperature increase rate of 300° C./hr under an ammonia gas flow of 400 ml/min. The temperature was kept at 600° C. for three hours. Then, the supply of ammonia gas was stopped. The temperature was lowered to room temperature by natural cooling under a nitrogen flow of 400 ml/min. Thus, a powder c1 was obtained.

Comparative Example 2

First, 20.0 g of rutile titanium oxide (trade name: "STR-100N" available from Sakai Chemical Industry Co., Ltd., specific surface area: 100 m$^2$/g) was put in an alumina boat. The workpiece was put in a furnace, and the temperature thereof was increased to 920° C. at a temperature increase rate of 300° C./hr under atmospheric conditions. The temperature was kept at 920° C. for one hour, and then lowered to room temperature by natural cooling. Thereafter, a 1.0-g portion of the resulting powder and 1.0 g of the powder obtained in Example 1 were dry mixed. Thus, a powder c2 was obtained.

Comparative Example 3

First, 20.0 g of rutile titanium oxide (trade name: "STR-100N" available from Sakai Chemical Industry Co., Ltd., specific surface area: 100 m$^2$/g) was put in an alumina boat. The workpiece was put in a furnace, and the temperature thereof was increased to 880° C. at a temperature increase rate of 300° C./hr under atmospheric conditions. The temperature was kept at 880° C. for one hour, and then lowered to room temperature by natural cooling. Thereafter, a 3.5-g portion of the resulting powder was put in an alumina boat. The workpiece was put in an atmospheric furnace, and the temperature was increased to 700° C. at a temperature increase rate of 300° C./hr under a hydrogen gas flow of 400 ml/min. The temperature was kept at 700° C. for two hours. Then, the temperature was lowered to 500° C. by natural cooling, and the supply of hydrogen gas was stopped. Further, the temperature was lowered to room temperature by natural cooling under a 100 vol % nitrogen gas flow of 400 ml/min. Thus, a powder c3 was obtained.

Comparative Example 4

First, 20.0 g of rutile titanium oxide (trade name: "STR-100N" available from Sakai Chemical Industry Co., Ltd., specific surface area: 100 m$^2$/g) was put in an alumina boat. The workpiece was put in a furnace, and the temperature thereof was increased to 920° C. at a temperature increase rate of 300° C./hr under atmospheric conditions. The temperature was kept at 920° C. for one hour, and then lowered to room temperature by natural cooling. Thus, a powder c4 was obtained.

Comparative Example 5

First, 3.5 g of rutile titanium oxide (trade name: "STR-100N" available from Sakai Chemical Industry Co., Ltd., specific surface area: 100 m$^2$/g) and 0.3 g of titanium metal (trade name: "Titanium, Powder" available from Wako Pure Chemical Industries) were dry mixed. Then, the mixture was put in an alumina boat. The workpiece was put in an atmospheric furnace, and the temperature thereof was increased to 725° C. at a temperature increase rate of 300° C./hr under a hydrogen gas flow of 400 ml/min. The temperature was kept at 725° C. for six hours. Then, the temperature was lowered to 500° C. by natural cooling, and the supply of hydrogen gas was stopped. Further, the temperature was lowered to room temperature by natural cooling under a nitrogen gas flow of 400 ml/min. Thus, a powder c5 was obtained.

Reference Example 2

ITO powder (trade name "Indium tin oxide nanopowder" available from Sigma-Aldrich Japan, particle size: <50 nm") was used (powder r2).

Figure 2:
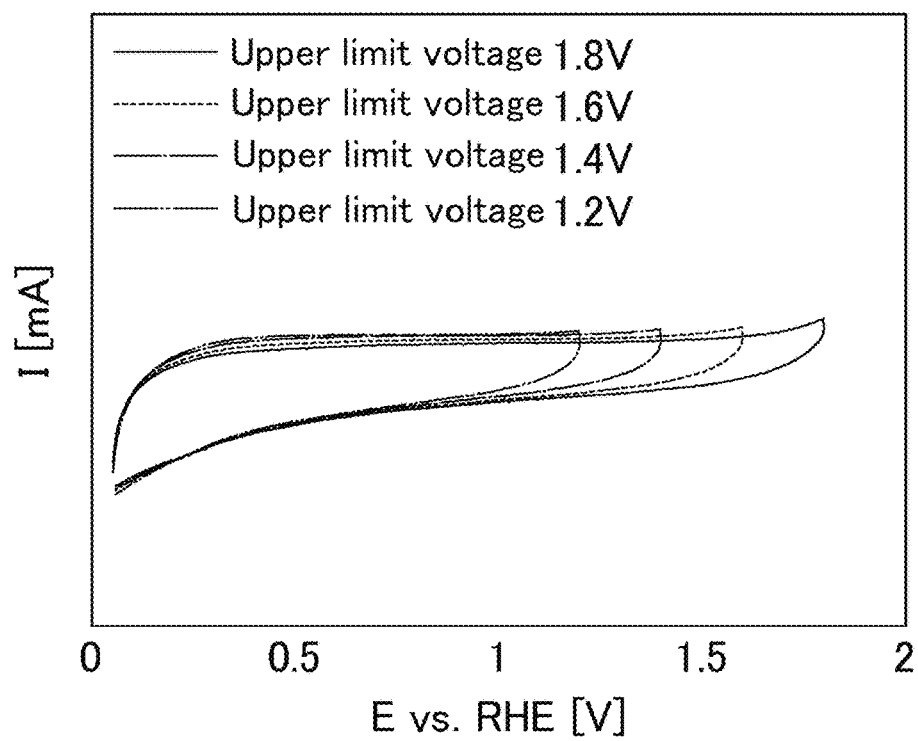
FIG. 2 shows graphs showing the results of the high potential durability tests of the particulate powders (powders) obtained in Example 2 and Reference Example 1.
Figure 2:
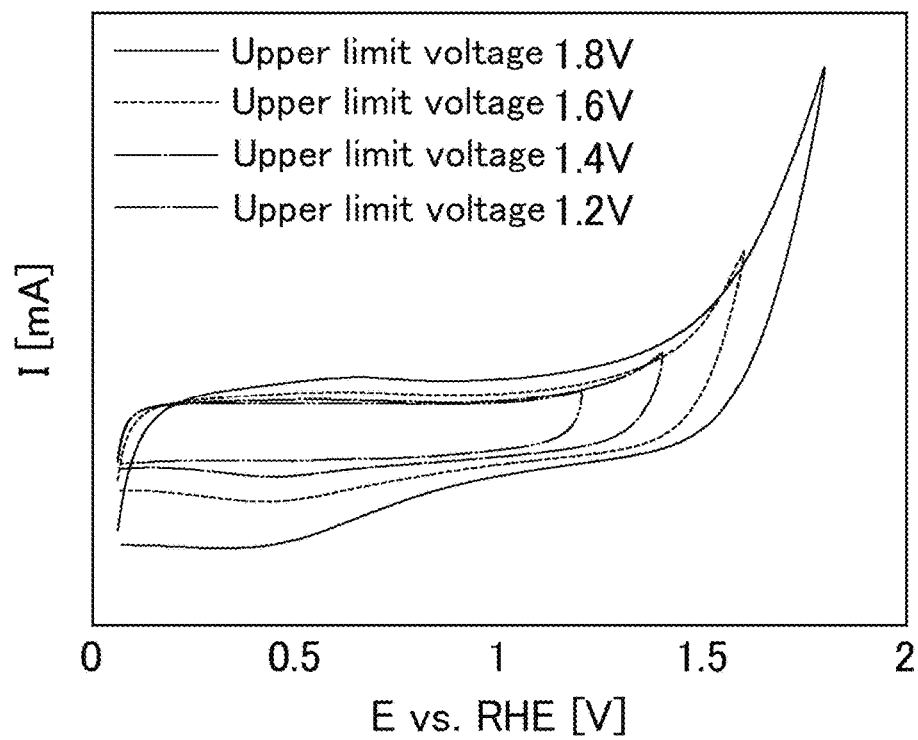
Figures 1, 3:
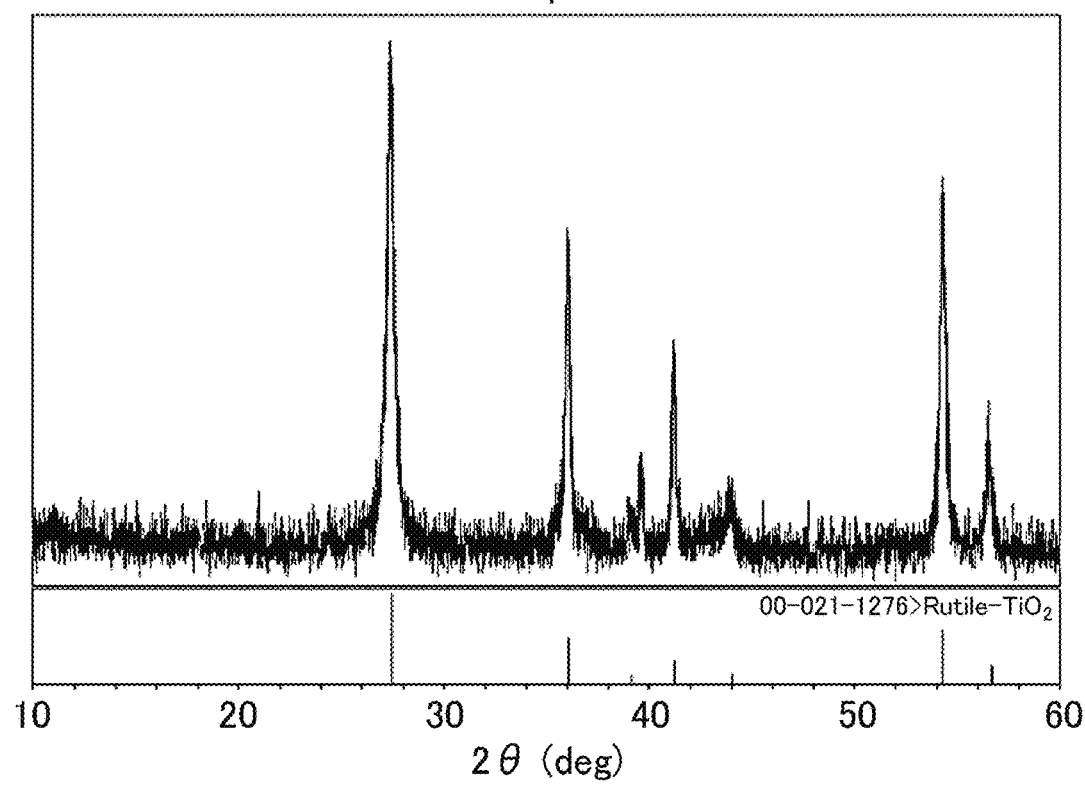
Figures 2, 3:
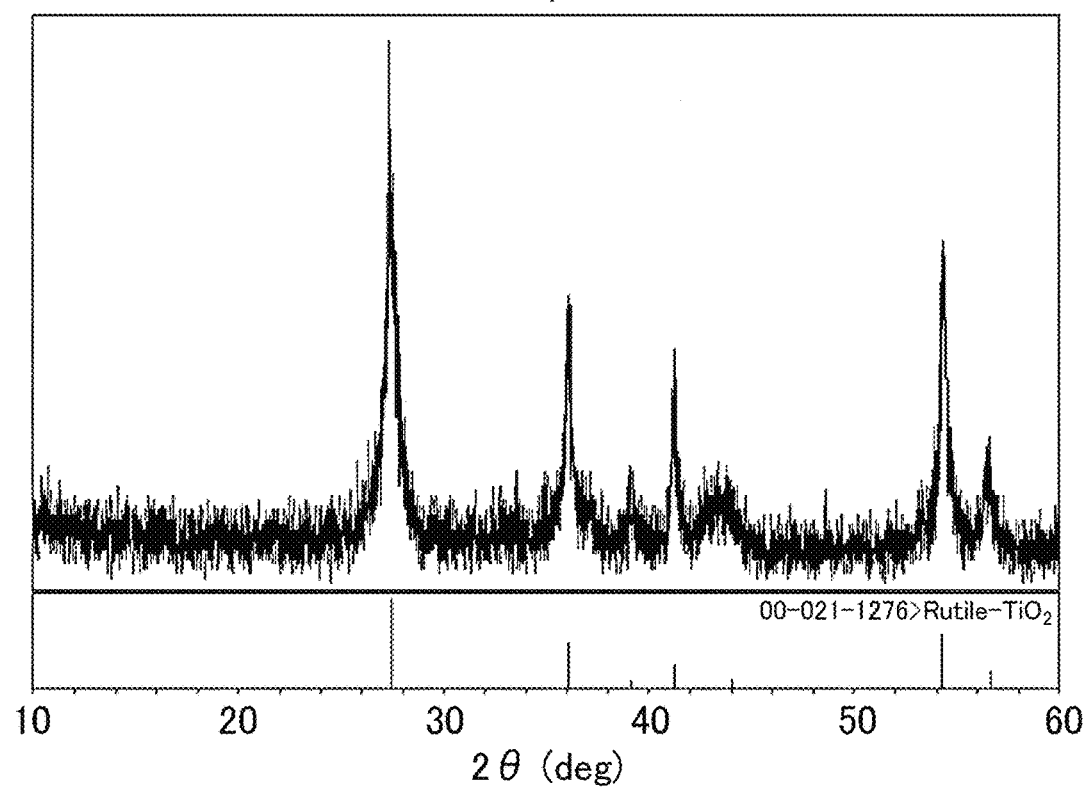
Figure 3:
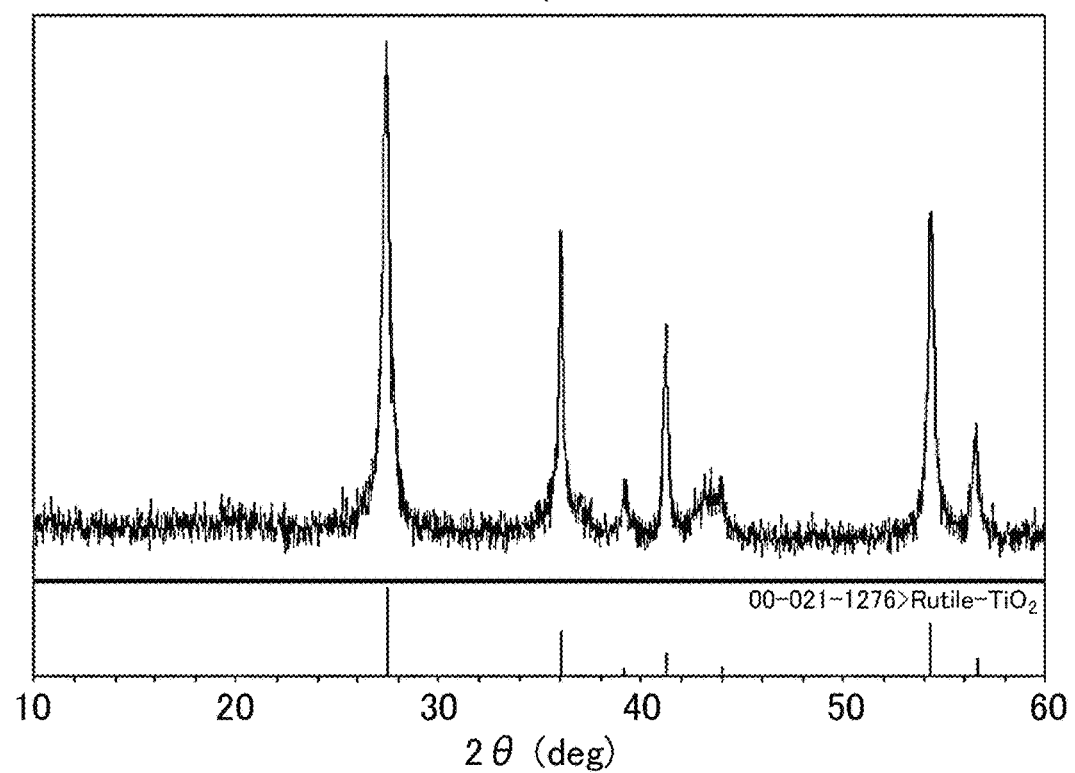
Figures 3, 4:
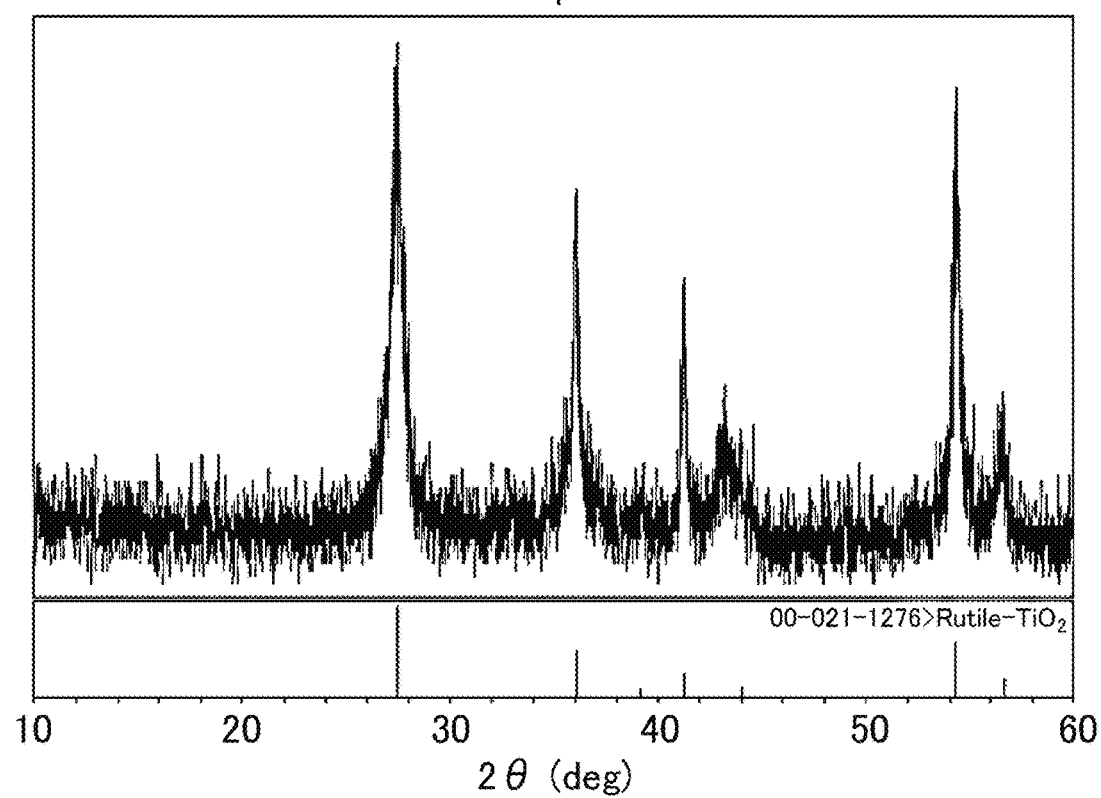
Figures 3, 4, 5:
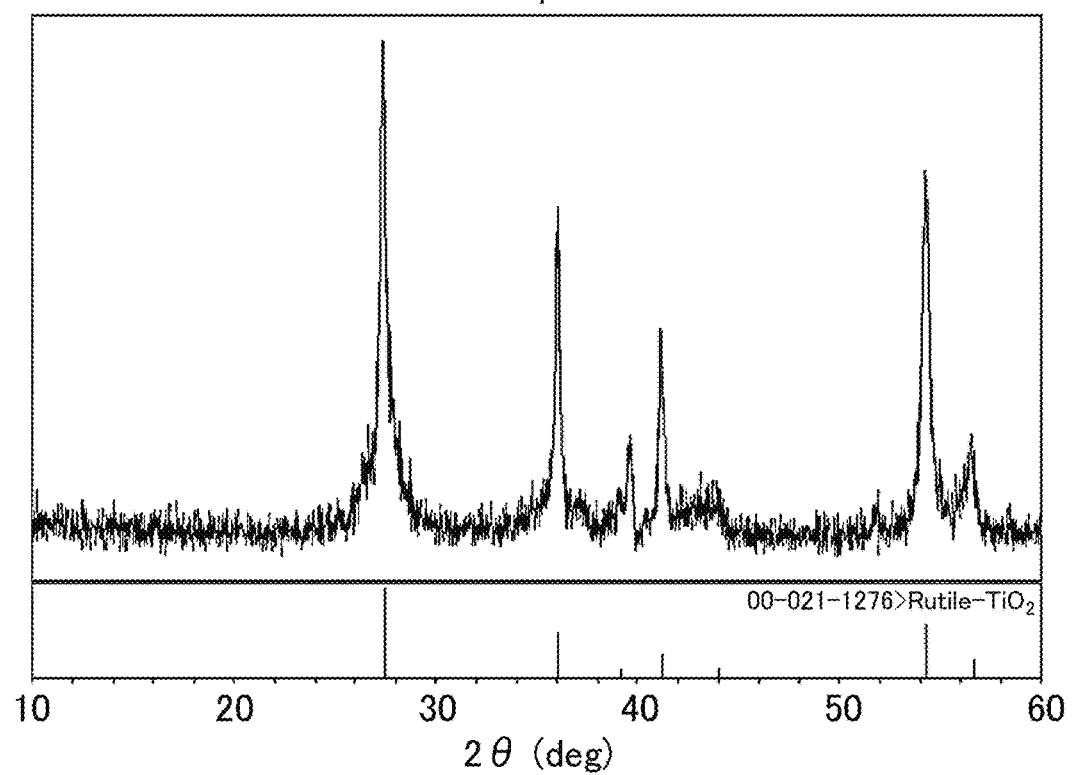
Figures 1, 4:
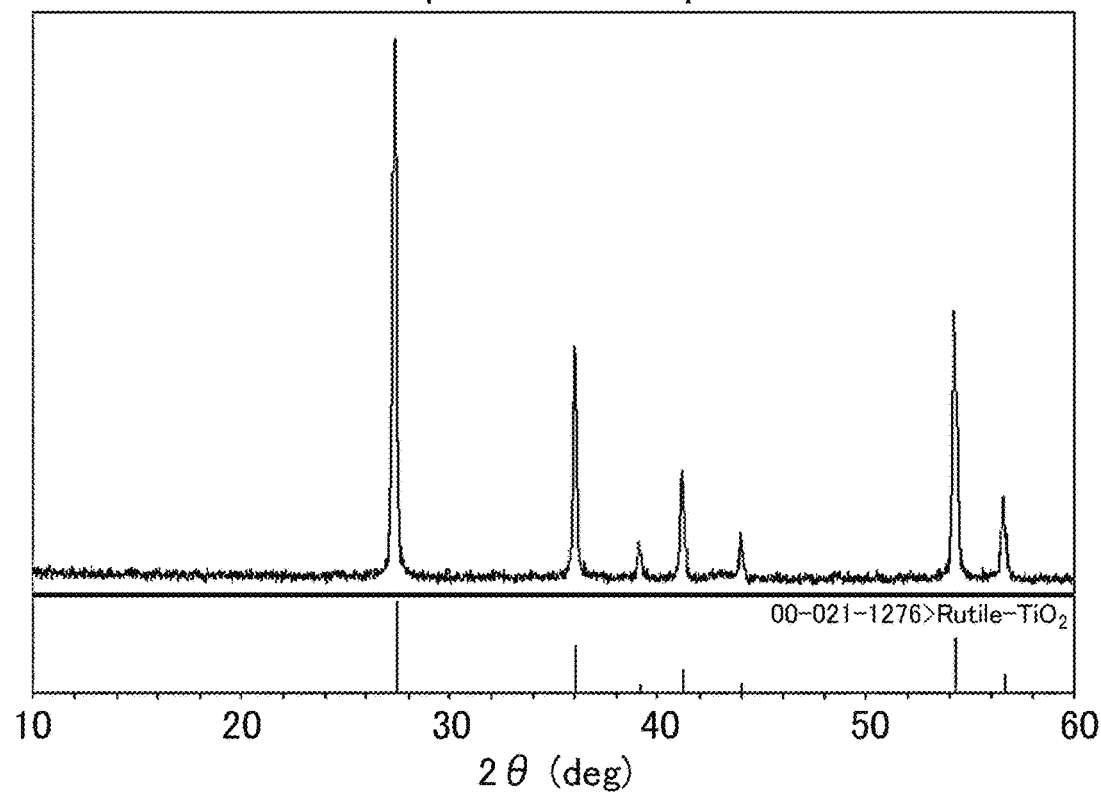
Figures 2, 4:
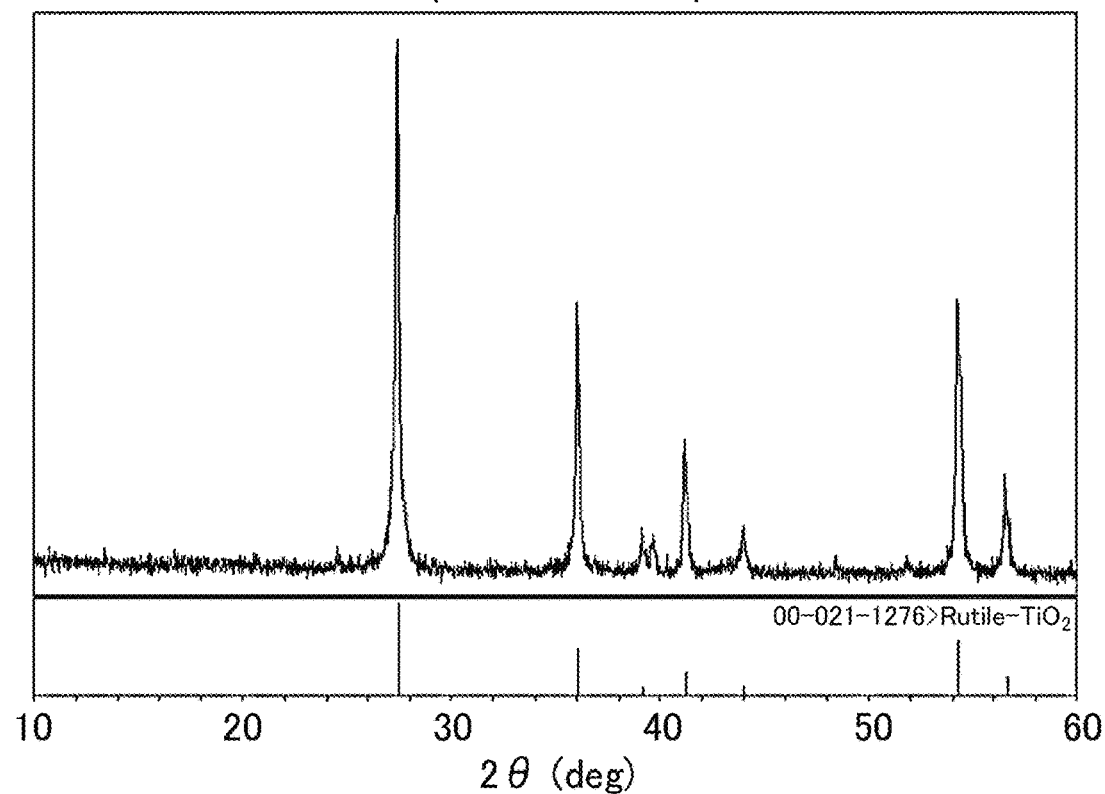
Figures 3, 4:
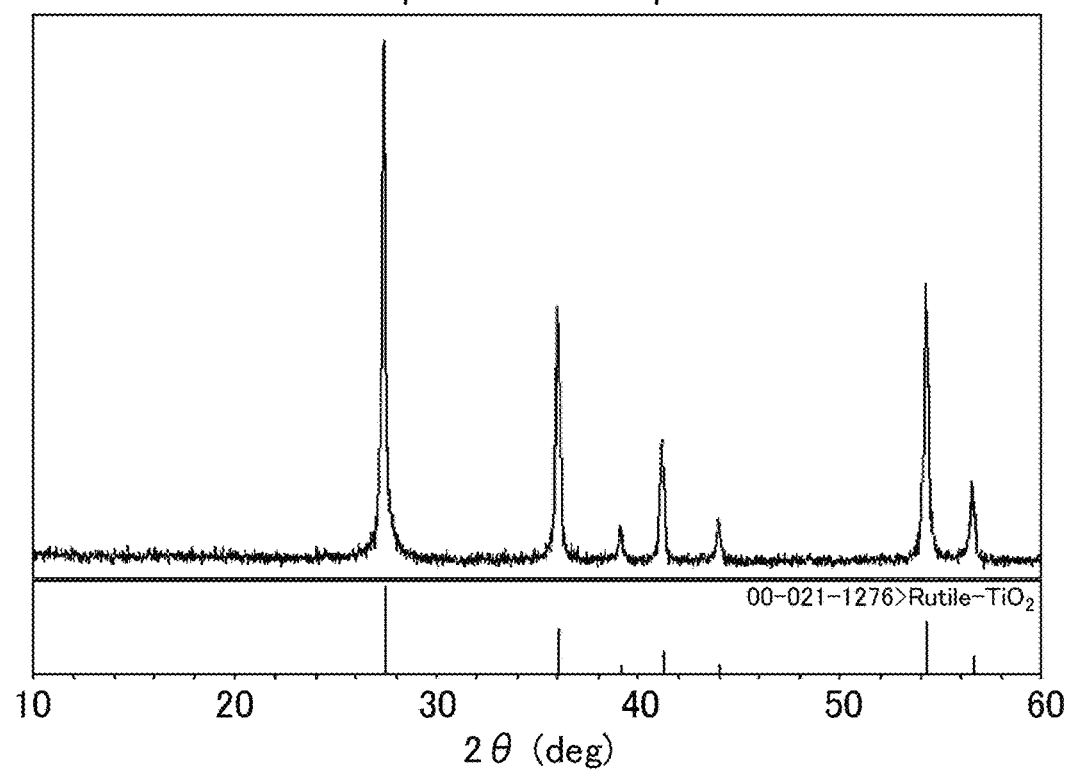
Figure 4:
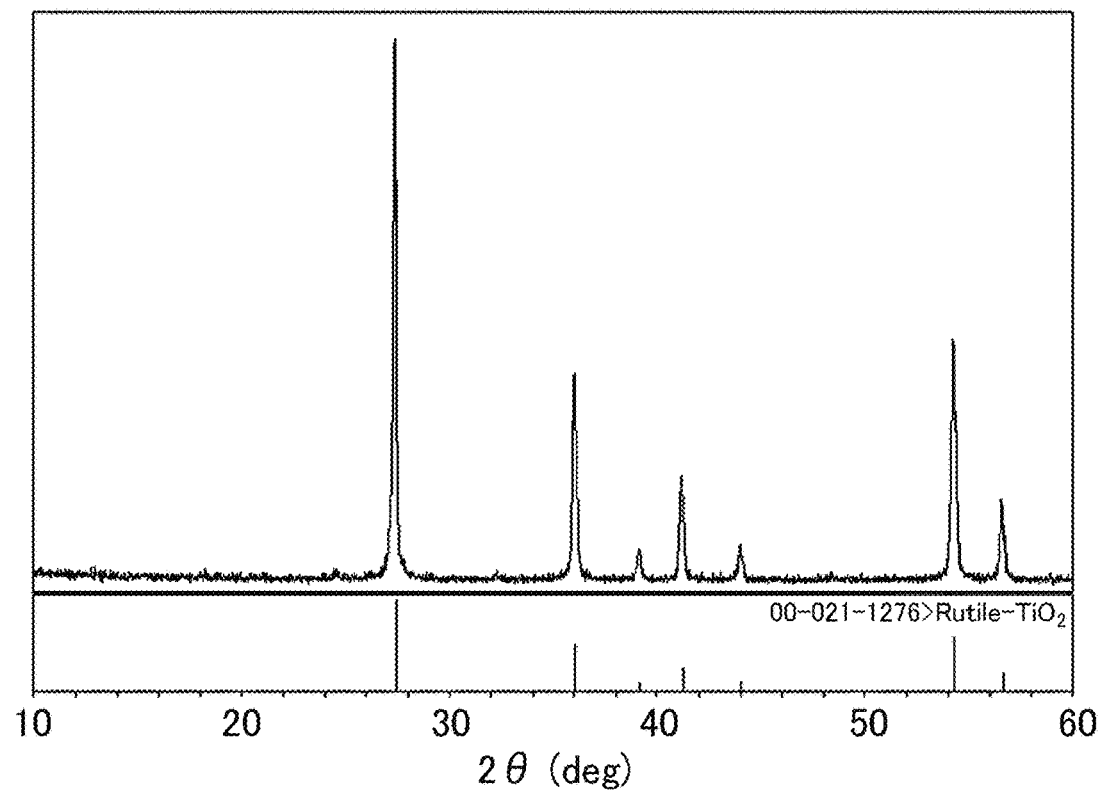
Figures 4, 5:
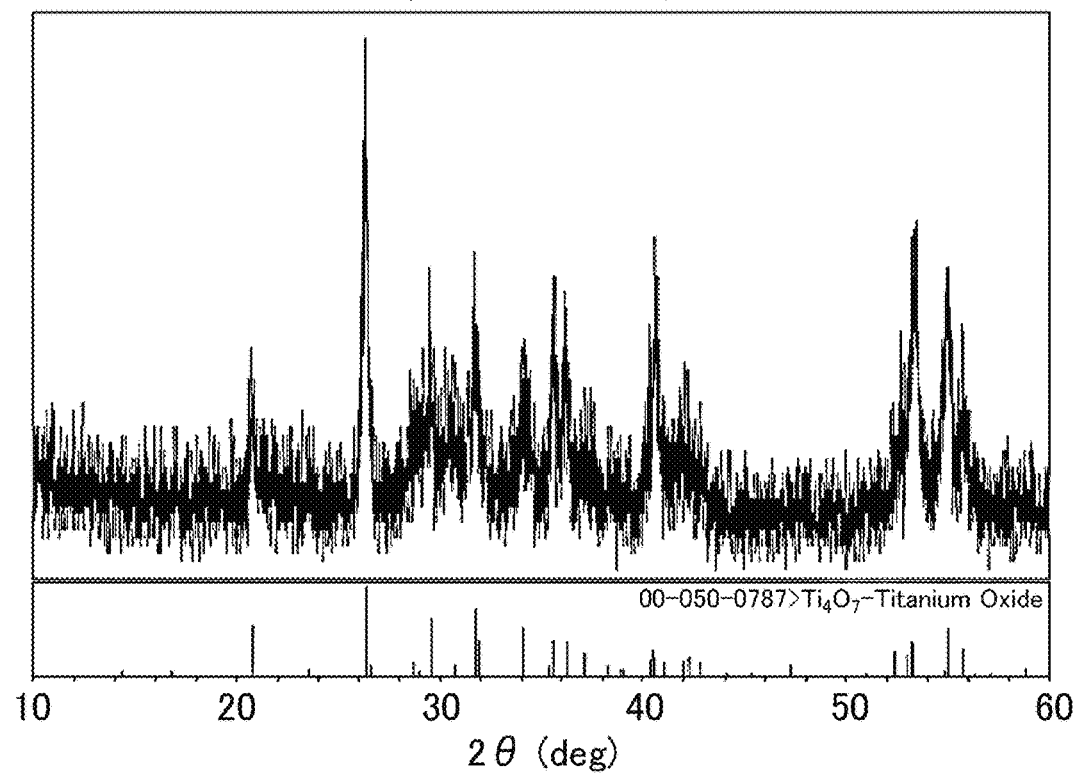
Figures 4, 5, 6:
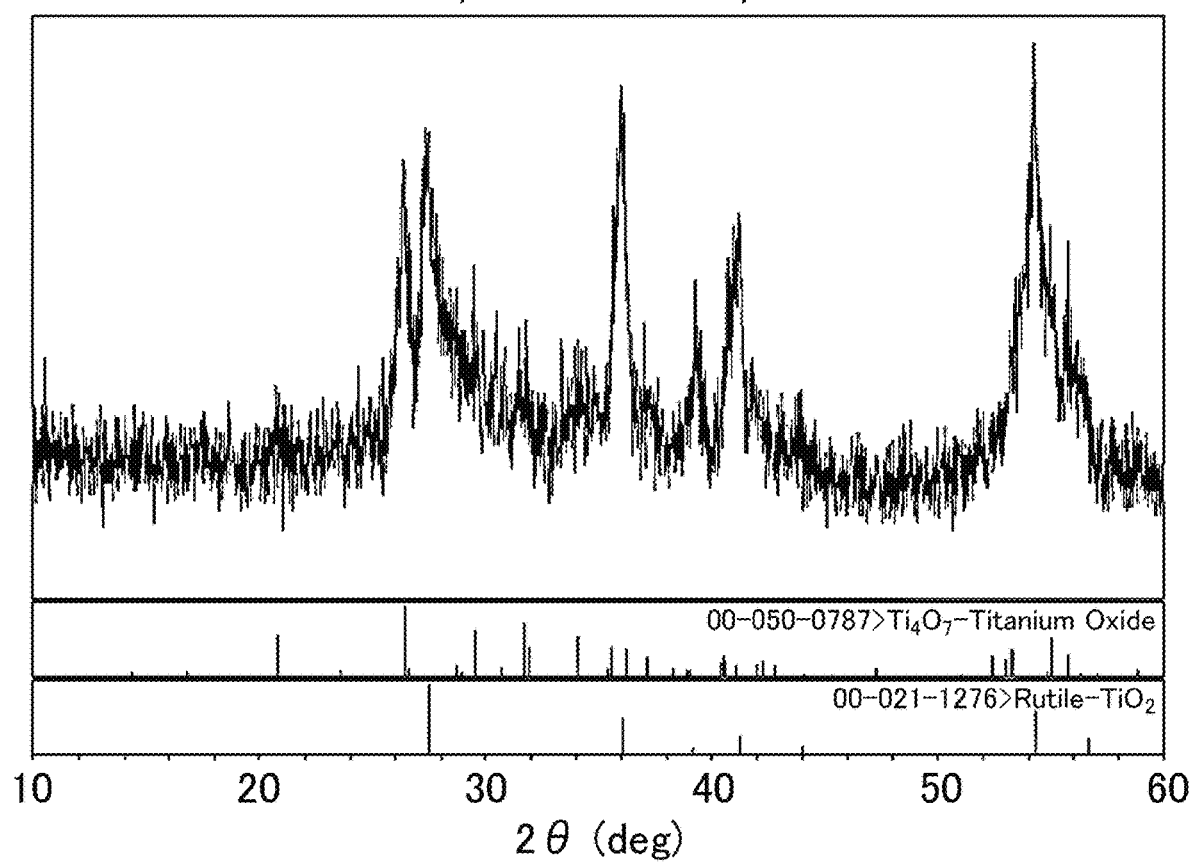

The powders (samples) obtained in the examples and the like were analyzed and evaluated by the above-described methods. The results are shown in Table 1. FIG. 1 shows photographs of the appearances of the powders. FIG. 2 shows the results of the high potential durability tests in Example 2 and Reference Example 1.

TABLE 1

| | Powder No. | XRD crystal structure | Value n in composition $TiO_n$ | L*a*b* color system | | | Volume resistance [Ω · cm] |
|---|---|---|---|---|---|---|---|
| | | | | L* | a* | b* | |
| Example 1 | 1 | Rutile (Main phase) | 1.57 | 40.4 | −2.7 | −2.2 | 5.08 |
| Example 2 | 2 | Rutile (Main phase) | 1.75 | 35.9 | −1.3 | −4.1 | $7.13 \times 10^{-2}$ |
| Example 3 | 3 | Rutile (Main phase) | 1.77 | 37.9 | −2.0 | −3.5 | $6.47 \times 10^{-2}$ |
| Example 4 | 4 | Rutile (Main phase) | 1.86 | 36.4 | −1.5 | −3.8 | $2.79 \times 10^{-2}$ |
| Example 5 | 5 | Rutile (Main phase) | 1.76 | 37.7 | −0.9 | −0.7 | $3.87 \times 10^{-2}$ |
| Comparative Example 1 | c1 | Rutile (Main phase) | 1.94 | 39.6 | −2.2 | −4.2 | $2.97 \times 10^{2}$ |
| Comparative Example 2 | c2 | Rutile (Main phase) | 1.83 | 49.2 | −2.4 | −2.2 | $1.40 \times 10^{2}$ |
| Comparative Example 3 | c3 | Rutile (Main phase) | 1.95 | 50.7 | −2.0 | −9.1 | $5.93 \times 10^{5}$ |
| Comparative Example 4 | c4 | Rutile (Main phase) | 1.99 | 97.1 | −1.1 | 4.0 | $8.56 \times 10^{5}$ |
| Comparative Example 5 | c5 | Magneli | 1.82 | 33.0 | −0.6 | −0.2 | $6.07 \times 10^{1}$ |
| Comparative Example 6 | c6 | Phase mixture (Magneli, Rutile) | 1.70 | 36.3 | −1.6 | −4.2 | $8.35 \times 10^{3}$ |
| Reference Example 1 | r1 | | | | | | $2.56 \times 10^{-2}$ |
| Reference Example 2 | r2 | | | | | | $3.18 \times 10^{0}$ |

Comparative Example 6

First, 2.0 g of rutile titanium oxide (trade name: "STR-100N" available from Sakai Chemical Industry Co., Ltd., specific surface area: 100 m²/g) and 0.3 g of titanium metal (trade name: "Titanium, Powder" available from Wako Pure Chemical Industries) were dry mixed. Then, the mixture was put in an alumina boat. The workpiece was put in an atmospheric furnace, and the temperature thereof was increased to 700° C. at a temperature increase rate of 300° C./hr under a hydrogen gas flow of 400 ml/min. The temperature was kept at 700° C. for two hours. Thereafter, the temperature was lowered to 450° C. at a temperature decrease rate of 200° C./hr, and the supply of hydrogen was stopped. Then, the temperature was kept at 450° C. for three minutes under an ammonia gas flow of 400 ml/min. Then, the supply of ammonia was stopped. The temperature was lowered to room temperature by natural cooling under a nitrogen flow of 400 ml/min. Thus, a powder c6 was obtained.

Reference Example 1

Carbon powder (trade name "Ketjen Black EC300J" available from Lion Specialty Chemicals Co., Ltd.) was used (powder r1).

In Table 1, "Rutile (Main phase)" means that the crystal structure contains a rutile crystalline phase as a main phase. The powder c6 in Comparative Example 6 has a structure of a phase mixture of a magneli phase and rutile $TiO_2$. This structure is referred to as "Magneli, Rutile" in Table 1.

The results of the examples and the comparative examples demonstrate the following:

The powders 1 to 5 obtained in Examples 1 to 5 are titanium suboxide particulate powders (electrically conductive materials) each having a composition of $TiO_n$ (where n is 1.5 or more and 1.90 or less), containing a rutile crystalline phase as a main phase, and having a brightness L* in the L*a*b* color system of 35 to 45.

On the other hand, the powders in the comparative examples are all different from the electrically conductive material of the present invention in that: the powder c1 has a value n of more than 1.90; the powder c2 has a brightness L* of higher than 45; the powders c3 and c4 each have a value n of more than 1.90 and a brightness L* of higher than 45; the powder c5 has a crystalline phase of $Ti_4O_7$ and a brightness L* of lower than 35; and for the powder c6, the main phase does not have a rutile crystal structure, and the X-ray powder diffraction pattern (Cu Kα, angle range in measurement: 2θ=10° to 60°) contains a peak assigned to $Ti_4O_7$ which has an intensity of 77% of the intensity of the maximum peak assigned to the rutile crystal structure.

Comparison of the volume resistances, which indicate electrical conductivity, of the powders having such differences shows that the powders 1 to 5 have significantly lower volume specific resistances than the powders c1 to c6 (titanium oxide or titanium suboxide), and have conductivities equal to or higher than that of ITO powder (powder r2) which is an electrically conductive material usually used as a heat ray shielding material or an antistatic material. In particular, the powders 2 to 5 have conductivities approximately equal to that of carbon powder (powder r1) which is an electrically conductive material usually used for an electrode material (see Table 1). These results demonstrate that the electrically conductive materials of the present invention have high electrical conductivities.

For $Ti_4O_7$, particles entirely having a composition of $Ti_4O_7$ theoretically show a value n of 1.75, whereas Comparative Example 5 (powder c5) shows a value n of 1.82, despite it has a crystal structure of a $Ti_4O_7$ single phase determined by XRD (see Table 1). This suggests that the outermost surface of particles subjected to oxidation has less oxygen vacancies than the inside thereof. Thus, the electrical conductivity is assumed to be insufficient.

Although not shown in the table, as a result of analysist of the metal elements other than Ti in each of the powders 1 and 5 obtained in Examples 1 and 5, the amount of the metal elements is found to be less than 0.2 mass %. Specifically, 0.074 mass % of a Nb element and 0.079 mass % of a Si element were detected in the powder 1, and 0.098 mass % of a Nb element and 0.019 mass % of a Si element were detected in the powder 5.

FIG. 2 shows the results of the high potential durability tests of the powder 2 in Example 2 and the powder r1 in Reference Example 1. In each graph, the horizontal axis represents a voltage and the vertical axis represents a current value, and the current during the voltage sweep in the cyclic voltammetry measurement is plotted. Each powder was subjected to cyclic voltammetry with sweep voltage ranges sequentially changed. With regard to the powder 2, no significant change is observed among the waveforms obtained with the upper limit voltages changed from 1.2 V to 1.8 V. On the other hand, with regard to the powder r1, great fluctuation of the current value is observed with an upper limit voltage higher than 1.2 V. This suggests that in the case of the powder r1, an oxidation current generates in a high potential region of 1.2 V or higher, that is, the decomposition reaction represented by $C+2H_2O \rightarrow CO_2 + 4H^+ + 4e^-$ occurs. On the other hand, in the case of the powder 2 and other electrically conductive materials of the present invention including a titanium suboxide particulate powder, the decomposition reaction does not occur even at high potential. Thus, the electrically conductive materials of the present invention can be more stably used for an electrode material for a polymer electrolyte fuel cell than carbon.

These results demonstrate that the electrode materials including the electrically conductive materials of the present invention such as the powders obtained in the examples have high electrical conductivity and higher resistance to a high potential and strongly acidic environment than materials containing platinum supported on a conventional carbon carrier.

Example 6

First, 0.60 g of the powder 2 and 128 g of ion-exchanged water were weighed into a beaker, and mixed under stirring. Thus, a slurry was obtained.

In a separate beaker, 1.3 g of an aqueous chloroplatinic acid solution (15.343% based on platinum, Tanaka Kikinzoku Kogyo) was diluted with 8.0 g of ion-exchanged water. Then, 0.053 g of hydrazine chloride (trade name "Hydrazine Dihydrochloride" available from Tokyo Chemical Industry Co., Ltd.) was added to the diluted solution, followed by mixing under stirring (the resulting product is referred to as an "aqueous solution mixture").

While the slurry was stirred, the entire aqueous solution mixture prepared in the separate beaker was added thereto, followed by mixing under stirring with the mixture heated to and maintained at a liquid temperature of 70° C. Further, 7.0 mL of a 1 N aqueous sodium hydroxide solution was added, followed by mixing under stirring. The mixture was heated to and maintained at a liquid temperature of 70° C. for one hour, followed by filtration, washing with water, drying to evaporate the entire moisture. Then, 0.5 g of the resulting powder was heated to 560° C. at a temperature increase rate of 600° C./hr under a hydrogen atmosphere, and the temperature was maintained at 560° C. for one hour, followed by naturally cooling to room temperature. Thus, a Pt-supporting powder 6 was obtained. The amount of Pt supported was 9.15 mass %.

Reference Example 3

A 50 mass % Pt-supporting carbon powder (N.E. Chemcat Corporation) was used (powder r3).

The powders (samples) obtained in Example 6 and Reference Example 3 were subjected to the above-described measurement of ECSA which is an indicator of electrochemical properties of the powders used as an fuel cell electrode material, for example. The results are shown in Table 2.

TABLE 2

|  | Powder No. | ECSA [$m^2/g^{Pt}$] |
|---|---|---|
| Example 6 | 6 | 67.4 |
| Reference Example 3 | r3 | 50.5 |

Comparison of the ECSAs of the powders 6 and r3 shown in Table 2 shows that the powder 6 has a higher ESCA than the powder r3. Thus, the electrode material including a structure containing a noble metal and/or its oxide supported on the electrically conductive material of the present invention is found to have high electrochemical properties.

The invention claimed is:

1. An electrically conductive material comprising a titanium suboxide particulate powder,
   the titanium suboxide particulate powder including
   a rutile crystalline phase as a main phase, and having
   a composition of $TiO_n$
   wherein n is 1.5 or more and 1.90 or less, and
   a brightness L* in the L*a*b*color system of 35 to 45.

2. An electrode material comprising a structure containing a noble metal and/or an oxide thereof supported on the electrically conductive material according to claim 1.

3. The electrode material according to claim 2, which is an electrode material for a polymer electrolyte fuel cell.

4. A fuel cell comprising an electrode that includes the electrode material according to claim 2.

5. A method for producing the electrically conductive material according to claim 1, the method comprising firing a raw material containing a titanium oxide having a specific surface area of 20 m$^2$/g or greater in a reducing atmosphere, followed by firing in an ammonia atmosphere at 500° C. or higher, or firing the raw material in a reducing atmosphere in the presence of ammonia.

6. The electrically conductive material of claim 1, wherein the titanium suboxide particulate powder is obtained from a mixture including titanium metal and titanium dioxide.

* * * * *